United States Patent Office 2,908,710
Patented Oct. 13, 1959

2,908,710

DIFUNCTIONAL F-CONTAINING ACIDS, ESTERS, AND ACID HALIDES

Earl T. McBee, West Lafayette, Ind., Carleton W. Roberts, Midland, Mich., and Gordon Wilson, Jr., West Lafayette, Ind., assignors to Hooker Electrochemical Company, Niagara Falls, N.Y., a corporation of New York No Drawing. Application September 16, 1957
Serial No. 683,985

16 Claims. (Cl. 260—481)

This invention relates to substituted chain-interrupted alkanedioic acids and derivatives thereof. It is more particularly concerned with such acids in which the atom in the aliphatic chain is sulfur or nitrogen, and the substituent is a lower-perfluoroalkyl radical or radicals, and the acid chlorides, alkyl esters and diols thereof.

The acids of the present invention are 3-mono, and 3,5-di-lower-perfluoroaklyl substituted 4-thia- or aza-alkanedioic acids, having the formulas:

$$S[CH(C_nF_{2n+1})CH_2COOH]_2$$

and

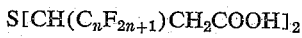
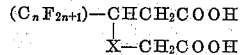

wherein $n$ is an integer from 1–7; and X represents S, NH, or N-lower-alkyl.

Thus, they include 3,5-bis(lowerperfluoroalkyl)-4-thiaheptane-dioic acid (which can also be named as a 4-thiapimelic acid), 3-lowerperfluoroalkyl-4-thiahexane-dioic acid, 3-lowerperfluoroalkyl-4-azahexanedioic acid, and 3-lowerperfluoroalkyl-4-loweralkyl-4-azahexanedioic acids. [The 3's and 4's could be interchanged]

The esters of the present invention are the difunctional lower-alkyl (1 to about 7 carbons) esters of the above acids.

The acid chlorides of the present invention have the formulas:

$$S[CH(C_nF_{2n+1})CH_2COCl]_2$$

and

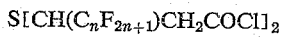
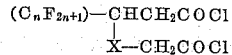

where $n$ and X have the above assigned values.

The diols of the present invention have the formulas:

$$S[CH(C_nF_{2n+1})CH_2CH_2OH]_2$$

and

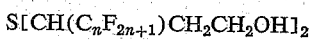
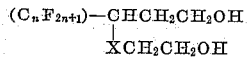

The compounds of the present invention can be prepared from one another, starting with the difunctional esters which are hydrolyzed to the acids. The acids are then used to form the acid chlorides and the diols.

The difunctional esters are prepared as follows:

(A) The lower-alkyl esters of 3,5-bis(lower-perfluoro-alkyl)-4-thiaheptanedioic acid are prepared from the addition reaction of hydrogen sulfide and a lower perfluoroalkyl substituted unsaturated lower alkyl ester, in the presence of small amounts of piperidine and of a 30 percent solution of benzyl trimethylammonium hydroxide in methyl alcohol according to the equation:

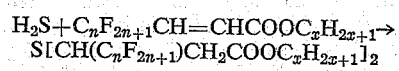

wherein $n$ and $x$ are each integers from 1 to 7. The starting lower-perfluoroalkyl substituted unsaturated lower alkyl esters are known compounds which may be made as shown in J. Am. Chem. Soc. 76, 3722 (1954).

(B) The lower-alkyl esters of 3-lowerperfluoroalkyl-4-thiahexanedioc acid are prepared from the addition reaction of a lower-alkyl mercaptoacetate and a lower-perfluoroalkyl substituted unsaturated lower alkyl ester in the presence of small amounts of piperidine and of methanolic benzyl trimethylammonium hydroxide.

(C) The lower-alkyl esters of 3-lower-perfluoroalkyl-4-thiahexanedioic acid may also be prepared by the reaction of lower-alkyl bromoacetate with the sodium salt of a lower-perfluoroalkyl substituted 3-mercapto lower alkyl ester, which reaction is conducted in ether solution at reflux temperatures.

(D) The lower-alkyl esters of 3-lower-perfluoroalkyl-4-azahexanedioic acid are prepared from the addition reaction of a lower-alkyl glycinate and a lower-perfluoroalkyl substituted unsaturated lower-alkyl ester. The reaction is completed after several hours at reflux temperatures.

(E) The lower-alkyl esters of 3-lower perfluoroalkyl-4-lower-alkyl-4-azahexanedioic acid are prepared by the reaction of a lower alkyl bromoacetate with a lower-perfluoroalkyl substituted-3-lower alkylamino lower alkyl ester. The reaction is conducted in a manner similar to that described in J. Am. Chem. Soc. 73, 2371 (1951) and involves sealing the reactants in a combustion tube, together with some anhydrous potassium carbonate, and heating the tube for some 24 hours at about 125 degrees centigrade. The tube contents are then taken up in ether, and then fractionated to recover the unreacted starting ester, and then the desired ester.

The difunctional acids of the present invention are prepared by hydrolysis of their corresponding esters. The hydrolysis may be conducted according to a variety of known methods. Thus, for the 3,5-di-lowerperfluoroalkyl-4-thiaalkanedioic acids hydrolysis under acidic conditions (acidolysis) e.g. with concentrated sulfuric acid, works best. But such acidolysis is not the preferred procedure yieldwise to make the mono-lowerperfluoroalkyl substituted-4-thiaalkanoic acids. Here hydrolysis by ester interchange using formic acid, has been found better. This procedure involves heating the starting ester at 100 degrees centigrade for several days with a 90 percent formic acid solution, with periodic removal of the ethyl formate which forms. This hydrolysis method gave yields on the order of 80 percent as opposed to the 20 percent yields obtainable by acidolysis.

To make the difunctional nitrogen containing acids, hydrolysis under basic conditions e.g. reflux with a 10 percent sodium hydroxide solution, is the preferred procedure.

The difunctional acid chlorides of the present invention are prepared by treating the corresponding difunctional acids with a large excess of thionyl chloride. The thionyl chloride is added to the starting acid, which is cooled. The reaction mixture is hand flamed until it becomes homogeneous. Then the mixture is refluxed, and the excess thionyl chloride distilled off.

The difunctional diols of the present invention are prepared from the corresponding difunctional acids, by reduction with lithium aluminum hydride.

The following examples will aid in illustrating the various compounds of the present invention and methods whereby they may be prepared, but are not to be construed as limiting.

EXAMPLE 1. — DIETHYL 3,5 - BIS(PERFLUOROMETHYL) - 4 - THIAPIMELATE[DIETHYL 3,5-BIS (PERFLUOROMETHYL) - 4 - THIAHEPTANEDIOATE]

In the hood a 200 milliliter, three-neck flask was fitted was a gas inlet tube, a stirrer, a thermometer and a reflux condenser. The condenser was connected to a bubble counter containing paraffin oil so that the rate of flow of hydrogen sulfide through the apparatus could be watched. Into the flask were placed 43 grams (0.277 mole) of ethyl 4,4,4-trifluorocrotonate (CF$_3$CH=CHCO$_2$Et) and 3 milliliters each of piperidine and of a 30 percent solution of benzyl trimethylammonium hydroxide in methyl alcohol. Hydrogen sulfide was passed through the flask while the solution was stirred. The temperature rose rapidly. By occasional cooling with ice water the temperature was kept between 40 and 48 degrees centigrade. After approximately a half hour the temperature dropped to 30 degrees centigrade and 3 more milliliters of piperidine and 3 milliliters of Triton B were added. More hydrogen sulfide was absorbed (as noted by the decreased rate of bubbles in the counter) and the temperature rose to 36 degrees centigrade. The gas addition tube (with a fritted glass end) was then lowered so that the end was below the liquid surface and hydrogen sulfide was bubbled through the solution for one half hour. The reaction mixture was then poured into 100 milliliters of water and 100 milliliters of ether was added. The ether layer was removed and the water layer was extracted with 50 milliliters of ether. The combined ether solutions were washed with 10 percent sulfuric acid, then 10 percent sodium carbonate and finally with water. After drying over anhydrous magnesium sulfate the ether was removed by distillation at atmospheric pressure. Twenty-seven grams (57 percent yield) of a light yellow liquid, diethyl 3,5-bis(perfluoromethyl) - 4 - thiapimelate were obtained; the boiling point was 112–115 degrees centigrade at 3 millimeters and the refractive index ($n_D^{20}$) was 1.3737.

*Analysis.*— Calculated for C$_{12}$H$_{16}$F$_6$O$_4$S: C, 38.92; H, 4.32. Found: C, 38.90; H, 4.31.

EXAMPLE 2. — DIETHYL 3,5-BIS(PERFLUOROPROPYL)-4-THIAPIMELATE [DIETHYL 3,5-BIS(PERFLUOROMETHYL) - 4 - THIAHEPTANEDIOATE]

Following the procedure of Example 1, but using 142 grams (0.53 mole) of ethyl 4,4,5,5,6,6,6-heptafluor-2-hexenoate in place of the ethyl 4,4,4-trifluorocrotonate, and conducting the reaction at 48 to 55 degrees centigrade, there was obtained 112 grams (74 percent) of the product, diethyl 3,5-bis(perfluoropropyl)-4-thiapimelate boiling at 100–102 degrees centigrade at 0.6 millimeter. The refractive index was found to be 1.3763 and the density 1.475.

*Analysis.*—Calculated for C$_{16}$H$_{16}$F$_{14}$O$_4$S: C, 33.68; H, 2.81; F, 46.66; S, 5.62. Found: C, 33.40; H, 2.85; F, 46.31; S, 5.23.

There was also obtained, a forerun of 9.0 grams (5.5 percent) of ethyl 3-mercapto-4,4,5,5,6,6,6-heptafluorohexanoate, boiling at 35–36 degrees centigrade at 0.6 millimeter and having a refractive index of 1.3774.

*Analysis.*—Calculated for C$_8$H$_9$F$_7$O$_2$S: C, 31.82; H, 3.00. Found: C, 32.09; H, 2.96.

EXAMPLE 3. — 3,5 - BIS(PERFLUOROPROPYL)-4-THIAHEPTANEDIOIC ACID [3,5-BIS-(PERFLUOROPROPYL)-4-THIAPIMELIC ACID]

Into a 500 milliliter three-neck flask fitted with stopper, stirrer and air-cooled reflux condenser was placed 42.8 grams (0.075 mole) of diethyl 3,5-bis(perfluoropropyl)-4-thiaheptanedioate in 150 milliliters of concentrated sulfuric acid. The reaction mixture was warmed on a steam bath for 45 minutes, while stirring, and then poured over 600 grams of ice. The product was taken up in ether, dried over Drierite and the ether removed by evaporation on a steam bath. The residue was recrystallized from toluene to yield 30.0 grams (78 percent) of fairly pure acid. The most insoluble form melts at 156–157 degrees centigrade while the other form melts over the range 108–116 degrees centigrade even after repeated recrystallizations.

*Analysis.*—Calculated for C$_{12}$H$_8$F$_{14}$O$_4$S: C, 28.02; H, 1.56. Found: C, 27.68; H, 1.85.

EXAMPLE 4.—3,5-BIS(PERFLUOROPROPYL)-4-THIAHEPTANEDIOYL CHLORIDE

Into a 500 milliliter round-bottomed flask were placed 51.4 grams (0.1 mole) 3,5-bis(perfluoropropyl)-4-thiapimelic acid (mixture of isomers). The flask was connected to a reflux condenser and with cooling in an ice bath a large excess (100 grams, 0.84 mole) of thionyl chloride was added through the condenser. The reaction mixture was hand flamed until it became homogeneous and then heated to reflux for 1½ hours. The excess thionyl chloride was removed by distillation at approximately 100 millimeters' pressure. The residue was distilled through a 35 millimeter column and yielded 49.4 grams of very light yellow product, boiling point 90–97 degrees centigrade at 1 millimeter. Redistillation produced 46.6 grams (84.5 percent yield) of colorless product, boiling at 86–88 degrees centigrade at 0.7 to 0.8 millimeter and having a refractive index of 1.3892.

*Analysis.*—Calculated for: C$_{12}$H$_6$F$_{14}$Cl$_2$O$_2$S: C, 26.15; H, 1.09; Cl, 12.88; F, 48.27. Found: C, 26.12; H, 1.33; Cl, 12.59; F, 48.46.

EXAMPLE 5.—3,5-BIS(PERFLUOROPROPYL)-4-THIAHEPTANE-1,7-DIOL

A two-liter flask was fitted with a Hershberg stirrer, a reflux condenser with a drying tube at the open end, and an addition funnel with a pressure-equalizing side arm. After the apparatus was swept out with a stream of dry nitrogen 600 milliliters of absolute ether and 10 grams of lithium aluminum hydride were placed in the flask. A solution of 114 grams (0.2 mole) of diethyl 3,5-bis(perfluoropropyl)-4-thiapimelate in 200 milliliters of absolute ether was then added dropwise over a period of one and a half hours. After the addition was complete the reaction mixture was refluxed for 2 hours. The mixture was then cooled in an ice bath and 200 milliliters of 95 percent ethanol were added dropwise. The resulting partially hydrolyzed reaction mixture was poured into a beaker containing 600 grams of ice and 90 milliliters of concentrated sulfuric acid. The ether layer was removed and the acidic aqueous solution was extracted with three 100 milliliter portions of ether. The combined ether solutions were washed with 100 milliliters of saturated sodium bicarbonate solution and dried over magnesium sulfate. Removal of the ether and distillation of the residue gave a yield of 83.7 grams (86.1 percent) of 3,5-bis(perfluoropropyl)-4-thiaheptane-1,7-diol, melting point at 47 degrees centigrade, boiling at 109–112 degrees centigrade at 0.2 to 0.3 millimeter and having a refractive index ($n_D^{19.5}$) of 1.3800 (supercooled).

*Analysis.*—Calculated for C$_{12}$H$_{12}$F$_{14}$O$_2$S: C, 29.65; H, 2.27; F, 54.73. Found: C, 29.68; H, 2.43; F, 54.82.

EXAMPLE 6.—DIETHYL 3-PERFLUOROPROPYL-4-THIAHEXANEDIOATE

*Method A.*—*From ethyl 4,4,5,5,6,6,6-heptafluoro-2-hexenoate*

A solution of 36.0 grams (0.3 mole) of ethyl mercaptoacetate in 50 milliliters of ether was added to 80.4 grams (0.3 mole) of ethyl 4,4,5,5,6,6,6-heptafluoro-2-hexenoate, 5 milliliters of BTA hydroxide (a 40 percent solution of benzyltrimethylammonium hydroxide in methanol) and 5 milliliters of piperidine in 150 milliliters of ether. The mixture was stirred at 25 degrees centigrade for 18 hours and refluxed an additional 2 hours. The ether solution was washed with water, 10 percent sulfuric acid, 10 percent sodium carbonate and again with water before drying over magnesium sulfate. Distillation gave 99.5 grams (85 percent) of the desired adduct, diethyl 3-perfluoropropyl-4-thiahexanedioate, boiling point 85 degrees centigrade (0.4 millimeter), $n_D^{20}$ 1.4028, $d_4^{20}$ 1.363.

*Analysis.*—Calculated for C$_{12}$H$_{15}$F$_7$O$_4$S: C, 37.11; H, 3.89; $MR_D$, 69.29. Found: C, 37.18, H, 3.73, $MR_D$, 69.51.

*Method B.—From ethyl 3-mercapto-4,4,5,5,6,6,6-heptafluorohexanoate*

Sodium hydride (1.2 grams, 0.05 mole) was added to 15.1 grams (0.05 mole) of ethyl 3-mercapto-4,4,5,5,6,6,6-heptafluorohexanoate in 150 milliliters of ether. After complete solution of the hydride, a solution of 8.35 grams (0.05 mole) of ethyl bromoacetate in 50 milliliters of ether was added and the mixture was refluxed for 16 hours. The ether solution was washed with water, dried with Drierite and distilled to yield 15.3 grams (79 percent) of diethyl 4-perfluoropropyl-3-thiahexanedioate. The physical constants were the same as those of the product from procedure A.

EXAMPLE 7.—3-PERFLUOROPROPYL-4-THIAHEXANEDIOIC ACID

A solution of 38.8 grams (0.1 mole) of diethyl 3-perfluoropropyl-4-thiahexanedioate in 24.5 grams of 90 percent formic acid was heated at 100 degrees centigrade for 48 hours with periodic removal of the ethyl formate which was produced. The mixture was added to 100 milliliters of water, made basic with sodium hydroxide and extracted with ether to remove any unreacted ester. After acidification with sulfuric acid, the aqueous solution was extracted with ether, the ether extracts were dried with magnesium sulfate and the ether was removed by distillation. The residue was recrystallized from benzene to give 27.0 grams (82 percent) of pure 3-perfluoropropyl-4-thiahexanedioic acid, melting point 72.5–73.5 degrees centigrade.

*Analysis.*—Calculated for $C_8H_7F_7O_4S$: C, 28.92; H, 2.13; S, 9.65. Found: C, 28.86; H, 2.10; S, 9.74.

EXAMPLE 8.—DIETHYL 3-PERFLUOROPROPYL-4-AZAHEXANEDIOATE

A solution of 4.6 grams (0.2 atom) of metallic sodium in 150 milliliters of absolute alcohol was added to 27.8 grams (0.2 mole) of ethyl glycinate hydrochloride in 50 milliliters of alcohol. The sodium chloride was removed by filtration and the alcoholic solution was reduced in volume to approximately 25 milliliters by distillation at reduced pressure. The solution was again filtered and 53.6 grams (0.2 mole) of ethyl 4,4,5,5,6,6,6-heptafluoro-2-hexenoate [J. Am. Chem. Soc. 76, 3722 (1954)] was added. After refluxing the mixture for 2 hours, it was fractionated to give 19.9 grams (37 percent recovery) of the unsaturated ester and 34.85 grams (75 percent) of diethyl 3-perfluoropropyl-4-azahexanedioate, boiling point 80 degrees centigrade (0.11 millimeter), $n_D^{20}$ 1.3831, $d_4^{20}$ 1.326.

*Analysis.*—Calculated for $C_{12}H_{16}F_7O_4N$: C, 38.82; H, 4.34; N, 3.78; $MR_D$, 65.08. Found: C, 39.10; H, 4.25; N, 4.04; $MR_D$, 65.34.

EXAMPLE 9.—3-PERFLUOROPROPYL-4-AZAHEXANEDIOIC ACID

A mixture of 10 grams (0.027 mole) of diethyl 3-perfluoropropyl-4-azahexanedioate and 35 milliliters of 10 percent sodium hydroxide was heated under reflux for 16 hours. After diluting with 100 milliliters of water, dilute (1:1) hydrochloric acid was added dropwise until a thick paste was produced. The solid was removed by filtration and recrystallized from 1200 milliliters of distilled water to give 7.6 grams (89 percent) of the dicarboxylic acid, 3-perfluoropropyl-4-azahexanedioic acid, melting point 156–157 degrees centigrade (decomposition).

*Analysis.*—Calculated for $C_8H_8F_7O_4N$: C, 30.48; H, 2.56; N, 4.45. Found: C, 30.70; H, 2.69; N, 4.75.

EXAMPLE 10.—DIETHYL 3-PERFLUOROPROPYL-4-METHYL-4-AZAHEXANEDIOATE

*Preparation of ethyl 3-methylamino-4,4,5,5,6,6,6-heptafluorohexanoate*

In a combustion tube was placed a mixture of 53.6 grams (0.2 mole) of ethyl 4,4,5,5,6,6,6-heptafluoro-2-hexenoate and 6.2 grams (0.2 mole) of methylamine. The tube was sealed and heated at 75 degrees centigrade for 10 hours and at 100 degrees centigrade for an additional 8 hours. Distillation of the contents gave 50.5 grams (85 percent) of the methylamino ester, ethyl 3-methylamino-4,4,5,5,6,6,6-heptafluorohexanoate, boiling point 88.5 degrees centigrade (20 millimeters) $n_D^{20}$ 1.3600, $d_4^{20}$ 1.340.

*Analysis.*—Calculated for $C_9H_{12}F_7O_2N$: C, 36.13, H, 4.04; N, 4.68; $MR_D$, 49.44. Found: C, 36.20; H, 4.04; N, 5.00; $MR_D$, 49.27.

Into a combustion tube were placed 20.9 grams (0.07 mole) of ethyl 3-methylamino-4,4,5,5,6,6,6-heptafluorohexanoate, 11.7 grams (0.07 mole) of ethyl bromoacetate and 11.0 grams (0.08 mole) of anhydrous potassium carbonate. The tube was sealed and heated at 125 degrees centigrade for 24 hours. The tube contents were diluted with 200 milliliters of ether and the ether solution was washed with water and dried with magnesium sulfate. Fractionation led to 8.55 grams (40 percent recovery) of the methylamino ester and 9.15 grams (34 percent conversion, 58 percent yield) of diethyl 3-perfluoropropyl-4-azahexanedioate, boiling point 95 degrees centigrade (1.9 millimeters) $n_D^{20}$ 1.3860, $d_4^{20}$ 1.298.

*Analysis.*—Calculated for $C_{13}H_{18}F_7O_4N$: C, 40.52; H, 4.71; N, 3.64; $MR_D$, 69.68. Found: C, 40.46; H, 4.99; N, 3.94; $MR_D$, 69.70.

Following the procedure of Example 2, $H_2S$ was added to $C_4F_9CH=CHCOOC_4H_9$, $C_6F_{13}CH=CHCOO$-iso $C_3H_7$, and $C_2F_5CH=CHCOOC_6H_{13}$, resulting in the production of $S[CH(C_4F_9)CH_2COOC_4H_9]_2$, $S[CH(C_6F_{13})CH_2COO$-$isoC_3H_7]_2$ and $S[CH(C_2F_5)CH_2COOC_6H_{13}]_2$, respectively.

Following the procedure of Example 3, hydrolysis of $$S[CH(CF_3)CH_2COOH]_2,$$

$S[CH(C_4F_9)CH_2COOC_4H_9]_2$, $S[CH(C_6F_{13})CH_2COO$-iso $C_3H_7]_2$ and $S[CH(C_2F_5)CH_2COOC_6H_{13}]_2$, resulted in the production of $$S[CH(CF_3)CH_2COOH]_2,$$

$S[H(C_4F_9)CH_2COOH]_2$, $S[CH(C_6F_{13})CH_2COOH]_2$, and $S[CH(C_2F_5)CH_2COOH]_2$, respectively.

Following the procedure of Example 4, reacting their corresponding difunctional acids (above) with thionyl chloride there was obtained $S[CH(CF_3)CH_2COCl]_2$, $S[CH(C_4F_9)CH_2COCl]_2$, $S[CH(C_6F_{13})CH_2COCl]_2$ and $S[CH(C_2F_5)CH_2COCl]_2$ respectively.

Following the procedure of Example 5, and reducing their corresponding difunctional acids (above) with lithium aluminum hydride, there was obtained $$S[CH(CF_3)CH_2CH_2OH]_2, \quad S[CH(C_4F_9)CH_2CH_2OH]_2$$
$$S[CH(C_6F_{13})CH_2CH_2OH]_2$$

and $S[CH(C_2F_5)CH_2CH_2OH]_2$ respectively.

Following the procedure of Example 6 (Method A) $HSCH_2COOC_4H_9$ was added to $C_7F_{15}CH=CHCOOC_4H_9$ resulting in the production of

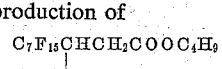

and $HSCH_2COOC_7H_{15}$ was added to $$CF_3CH=CHCOOC_7H_{15}$$

resulting in the production of

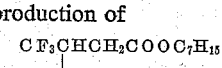

Following the procedure of Example 6 (Method B)

butyl bromoacetate was reacted with the sodium salt of butyl 3-mercapto-4,4,5,5,5-pentafluoropentanoate, resulting in the production of dibutyl 3-perfluoropentyl-4-thiahexanedioate.

Following the procedure of Example 7, hydrolysis of the above S-containing esters, resulted in the production of their respective acids, i.e.:

$$\underset{\underset{SCH_2COOH}{|}}{C_7F_{15}CHCH_2COOH} \qquad \underset{\underset{SCH_2COOH}{|}}{CF_3CHCH_2COOH}$$

and $$\underset{\underset{SCH_2COOH}{|}}{C_5F_{11}CHCH_2COOH}$$

Following the procedure of Example 8

$$H_2NCH_2COOC_4H_9$$

was added to $C_7F_{15}CH=CHCOOC_4H_9$ resulting in the production of $$\underset{\underset{NHCH_2COOC_4H_9}{|}}{C_7F_{15}CHCH_2COOC_4H_9}$$

and $H_2NCH_2COOC_7H_{15}$ was added to $$CF_3CH=CHCOOC_7H_{15}$$

resulting in the production of $$\underset{\underset{NHCH_2COOC_7H_{15}}{|}}{CF_3CHCH_2COOC_7H_{15}}$$

Following the procedure of Example 10, various lower alkyl-3-loweralkylamino-lower perfluoroalkyl substituted alkanoate esters were prepared. Thus, n-butylamine was reacted with ethyl 4,4,5,5,6,6,6-heptafluoro-2-hexenoate, which resulted in obtaining ethyl 3-butylamino-4,4,5,5,6,6,6-heptafluorohexanoate; and n-propylamine was reacted with butyl 4,4,5,5,5-pentafluoro-2-pentenoate, which resulted in the obtaining of butyl 3-propylamino-4,4,5,5,5-pentafluoropentanoate. The above esters were then reacted with ethylbromoacetate and butylbromoacetate respectively, which resulted in the obtaining of diethyl-4-perfluoropropyl-3-butyl-3-azahexanedioate, and of dibutyl-4-perfluoroethyl-3-propyl-3-azahexanedioate.

Following the procedure of Example 9, hydrolysis of diethyl 4-perfluoropropyl-3-methyl-3-azahexanedioate, of diethyl 4-perfluoropropyl-3-butyl-3-azahexanedioate, and of dibutyl-4-perfluoroethyl-3-propyl-3-azahexanedioate, resulted respectively in the obtaining of 4-perfluoropropyl-3-methyl-3-azahexanedioic acid, 4-perfluoropropyl-3-butyl-3-azahexanedioic acid and 4-perfluoroethyl-3-propyl-3-azahexanedioic acid.

Following the procedure of Example 4, by reacting their corresponding difunctional acids with thionyl chloride, there was obtained $$\underset{\underset{SCH_2COCl}{|}}{C_7F_{15}CHCH_2COCl} \qquad \underset{\underset{SCH_2COCl}{|}}{CF_3CHCH_2COCl}$$

$$\underset{\underset{SCH_2COCl}{|}}{C_3F_7CHCH_2COCl} \qquad \underset{\underset{NHCH_2COCl}{|}}{C_3F_7CHCH_2COCl}$$

$$\underset{\underset{CH_3-N-CH_2COCl}{|}}{C_3F_7CHCH_2COCl} \qquad \underset{\underset{C_3H_7-N-CH_2COCl}{|}}{C_2F_5CHCH_2COCl}$$

Following the procedure of Example 5, by reducing their corresponding difunctional acids with lithium aluminum hydride, the following diols were obtained:

$$\underset{\underset{SCH_2CH_2OH}{|}}{C_7F_{15}CHCH_2CH_2OH} \qquad \underset{\underset{SCH_2CH_2OH}{|}}{CF_3CHCH_2CH_2OH}$$

$$\underset{\underset{SCH_2CH_2OH}{|}}{C_3F_7CHCH_2CH_2OH} \qquad \underset{\underset{NHCH_2CH_2OH}{|}}{C_3F_7CHCH_2CH_2OH}$$

$$\underset{\underset{CH_3-N-CH_2CH_2OH}{|}}{C_3F_7CHCH_2CH_2OH} \qquad \underset{\underset{C_3H_7-N-CH_2CH_2OH}{|}}{C_2F_5CHCH_2CH_2OH}$$

The compounds of the present invention are useful in the preparation of condensation elastomers which have high thermal stability and resistance to hydrocarbon solvents e.g. fuels, synthetic oils, hydraulic fluids, and which are used as seals and liners for gasoline tanks and the like.

These elastomers are made by curing high molecular weight linear polyesters, which are made by reacting the perfluoroalkyl-substituted dicarboxylic compounds of the present invention (the acids, esters and acid chlorides) with a polyhydric alcohol. The polyhydric alcohols which may be used can vary greatly, but the diols are preferred, e.g., propylene glycol, octanediol, 3-perfluoroheptyl-1,5-pentanediol, and the diols of the present invention.

The use of the diacid chloride greatly facilitates the esterification reaction, especially when a fluorinated polyhydric alcohol is used. Esterification is carried out until the linear polyester has a number average molecular weight as determined from viscosity of about 3000, and preferably greater than 5000. The process is generally carried out in an inert atmosphere such as nitrogen, especially when at higher temperatures, and the temperatures used may be from below room temperature at the start of the reaction to 250 degrees centigrade or over at the end of the reaction, depending upon the nature of the reactants and the products. After the desired molecular weight has been reached, the linear polyester is reacted with a cross-linking agent to produce the cured elastomer.

The cross-linking may be accomplished by one of several methods. First the linear polyester may be cross-linked by reacting it with a free radical polymerization catalyst such as peroxides, typified by dicumyl peroxide, benzoyl peroxide, tert-butyl peroxide, chlorobenzoic peroxides. It is believed that the free radical formed attacks the active hydrogen in the chain and sets up a bond between one chain and another. The linear polyesters may also be extended and cross-linked by reaction with polyisocyanates, for instance with a diisocyanate such as methylene bis(4-phenyl-isocyanate). Alternatively, a small amount of an unsaturated acid such as maleic, fumaric, itaconic, hexenedioic acid, and bis(alpha,alpha-prime-methylene)hydrocarbon dicarboxylic acid can be included in the linear polyester during the esterification, and the linear polyester subsequently cross-linked either with or without a copolymerizable monomer containing a carbon-to-carbon double bond such as styrene, divinyl benzene, vinyl pyridine, acrylates, vinyl acetate, et cetera, in the presence of a free-radical polymerization catalyst such as dicumyl peroxide, benzoyl peroxide, tert-butyl peroxide, chlorobenzoic peroxides. In another method the terminal hydroxyl groups of the linear chains may be extended and cross-linked by reaction with polyepoxides in the presence or absence of catalysts such as amines, diamines or dicarboxylic acids, or by polyketones, polyacid chlorides, anhydrides and polyanhydrides.

The preferred epoxy resins are the phenyl glycidyl ether reaction products of bisphenol and epichlorohydrin.

In order to impart certain desired properties, various fillers, reinforcing agents, antioxidants, softeners and extenders traditionally used in the rubber art may be incorporated in the elastomer of the present invention.

To illustrate more fully how the elastomers are made:

A reaction tube was fitted with a gas inlet tube extending to the bottom of the reactor and an outlet was provided which could be attached to either a vacuum source or left open to the atmosphere. The apparatus was placed in an oil bath whose temperature was controlled by a Fenwall thermo-switch. Into the reaction tube was placed equimolar parts of 3,5-bis(perfluoropropyl)-4-thiaheptanedioyl chloride and 2,2,3,3,4,4-hexafluoropentanediol and the mixture was heated slightly. Pure nitrogen was passed through the reaction mixture during the heating period. A reaction ensued characterized by strong evolution of hydrogen chloride. After the initial reaction subsided, the temperature of the reaction mixture was increased gradually over some 22 hours until it reached about 200 degrees centigrade. Purified nitrogen was slowly passed through the reaction mixture during this period. After the temperature was maintained at about 200 degrees centigrade for a short time, a vacuum was applied intermittently for 15–30 minutes at the end of the reaction. The resulting linear polyester containing fluorine had a viscosity of about 2.94 poises at 169 degrees centigrade, and a number average molecular weight calculated from the viscosity measurement of about 7.480. This was then mixed with about 25 percent by weight of Di-Cup 40C (a mixture containing 40 percent of dicumyl peroxide on calcium carbonate, sold by Hercules Powder Company) and transferred to a mold where it was cured by heating at 150 degrees centigrade for about 50 minutes thus transforming the starting linear polyester into tough, elastic, vulcanized materials. The above procedure is applicable to all the compounds of the present invention.

Similar elastomers can also be made from other difunctional perfluoroalkyl containing materials such as those in which the carbon chain is oxygen interrupted e.g. acids such as $CF_2[(CF_2)_nCH_2OCH_2COOH]_2$, wherein $n$ is a small integer, and the lower-alkyl esters, acid chlorides, and diols thereof. These compounds are made by first preparing the esters by treating the disodium salt of $CF_2[(CF_2)_nCH_2OH]_2$ with lower alkyl bromoacetate to give $CF_2[(CF_2)_nCH_2OCH_2COO$ lower-alkyl$]_2$. Then the esters are converted to their corresponding dicarboxylic by acidolysis with formic acid. These acids may then be converted to the acid chloride with thionyl chloride. The above may be better understood by the following illustrations which exemplify the general procedures involved.

ILLUSTRATION I.—DIETHYL 5,5,6,6,7,7,-HEXAFLUORO-3,9-DIOXAUNDECANEDIOATE

A solution of sodium ethoxide prepared from 4.6 grams (0.2 g. atom) of sodium and 110 milliliters of absolute ethanol was added to a solution of 21.2 grams (0.1 mole) of 2,2,3,3,4,4-hexafluoropentanediol in 200 milliliters of dioxane. After removal of the ethanol by distillation through a 30 centimeter Vigreux column, a solution of 33.4 grams (0.2 mole) of ethyl bromoacetate in 100 milliliters of dioxane was added and the mixture was refluxed for 5 hours. The solvent was removed by distillation, the residue was diluted with 500 milliliters of benzene and the sodium bromide and unreacted diol were removed by washing with water. After drying with Drierite, the benzene solution was fractionated to give 29.6 grams (77 percent) of the diester-diether, boiling point 134–135 degrees centigrade (0.1 millimeter), $n_D^{20}$ 1.4010, $d_4^{20}$ 1.345.

Analysis.—Calculated for $C_{13}H_{18}F_6O_6$: C, 40.63; H, 4.72; $MR_D$, 69.58. Found: C, 40.93; H, 4.50; $MR_D$, 69.40.

ILLUSTRATION II.—5,5,6,6,7,7-HEXAFLUORO-3,9-DIOXAUNDECANEDIOIC ACID

A solution of 6.0 grams (0.016 mole) of diethyl 5,5,6,6,7,7 - hexafluoro - 3,9 - dioxaundecanedioate in 50 milliliters of 90 percent formic acid was fractionally distilled until no further ethyl formate could be obtained. The excess formic acid was removed by distillation at 100 millimeters and the solid residue was recrystallized from toluene to give 3.9 grams (76 percent) of the dicarboxylic acid, melting point 82–83 degrees centigrade.

Analysis.—Calculated for $C_9H_{10}F_6O_6$: C, 32.94; H, 3.07. Found: C, 32.89; H, 3.09.

ILLUSTRATION III.—5,5,6,6,7,7-HEXAFLUORO-3,9-DIOXAUNDECANEDIOYL CHLORIDE

Thionyl chloride (17.9 grams, 0.15 mole) was added to 16.4 grams (0.05 mole) of 5,5,6,6,7,7-hexafluoro-3,9-dioxaundecanedioic acid and the mixture was refluxed for 3.5 hours. The excess thionyl chloride was removed by distillation at 100 millimeters pressure and the residue was distilled in vacuo to give 16.9 grams (93 percent) of slightly yellow liquid product, boiling point 110 degrees centigrade (0.1 millimeter), melting point 49–52 degrees centigrade. Recrystallization from hexane produced a pure sample, melting point 52.5–53 degrees centigrade.

Analysis.—Calculated for $C_9H_8F_6O_4Cl_2$: C, 29.61; H, 2.21; Cl, 19.42. Found: C, 29.61; H, 2.43; Cl, 19.20.

The diamide, obtained by passing ammonia into an ethereal solution of the acid chloride, was recrystallized from 95 percent ethanol, melting point 146.5–147.5 degrees centigrade.

Analysis.—Calculated for $C_9H_{12}F_6O_4N_2$: C, 33.14; H, 3.71; N, 8.59. Found: C, 33.05; H, 3.90; N, 8.77.

The diether-diesters may also be prepared by alternate procedures such as those illustrated below:

ILLUSTRATION IV–A.—9 - HYDROXY - 6,6,7,7,8,8-HEXAFLUORO - 4 - OXANONANENITRILE AND 6,6,7,7,8,8 - HEXAFLUORO - 4,10 - DIOXATRIDECANEDINITRILE

A reaction mixture consisting of 21.3 grams (0.1 mole) of 2,2,3,3,4,4-hexafluoropentanediol, 2.4 grams of 40 percent aqueous potassium hydroxide and 21.2 grams (0.4 mole) of acrylonitrile in 300 milliliters of ether was stirred at 25 degrees centigrade for 31 hours. The ether solution was washed with water until the washings were neutral to litmus, dried with magnesium sulfate and fractionated to give 11.05 grams (42 percent) of the mono-cyanoethylation product, boiling point 126 degrees centigrade (0.08 millimeter), $n_D^{20}$ 1.3881, $d_4^{20}$ 1.481.

Analysis.—Calculated for $C_8H_9F_6O_2N$: C, 36.23; H, 3.42; N, 5.28; $MR_D$, 42.55. Found: C, 36.00; H, 3.27; N, 5.36; $MR_D$, 42.27.

A higher boiling fraction consisted of 8.85 grams (28 percent) of the dicyanoethylation product, boiling point 180 degrees centigrade (0.08 millimeter), $n_D^{20}$ 1.4040, $d_4^{20}$ 1.381.

Analysis.—Calculated for $C_{11}H_{12}F_6O_2N_2$: C, 41.52; H, 3.80; N, 8.80; $MR_D$, 56.54. Found: C, 41.39; H, 3.79; N, 8.99; $MR_D$, 56.36.

ILLUSTRATION IV–B.—DIETHYL 6,6,7,7,8,8,-HEXAFLUORO-4,10-DIOXATRIDECANEDIOATE

A solution of 10.0 grams (0.031 mole) of 6,6,7,7,8,8-hexafluoro-4,10-dioxatridecanedinitrile in 30 milliliters of absolute ethanol was saturated with hydrogen chloride at —20 degrees centigrade. After storage in a refrigerator for 20 days, a portion of the excess hydrogen chloride and ethanol was removed by evaporation at 110 millimeters and the remaining oil was heated with 100 milliliters of water at 65 degrees centigrade for one hour. The ether extracts of the aqueous suspension were dried with magnesium sulfate and fractionated to yield 9.00 grams (70 percent of the theoretical yield) of the diester-diether, boiling point 131–132 degrees centigrade (0.07 millimeter), $n_D^{20}$ 1.4041, $d_4^{20}$ 1.287.

Analysis.—Calculated for $C_{15}H_{22}F_6O_6$: C, 43.70; H, 5.38; $MR_D$, 78.84. Found: C, 43.84; H, 5.58; $MR_D$, 78.38.

ILLUSTRATION V.—METHYL 9-HYDROXY-6,6,7,7,8,8-HEXAFLUORO-4-OXANONANOATE AND DIMETHYL 6,6,7,7,8,8 - HEXAFLUORO-4,10-DIOXADECANEDIOATE

Methyl acrylate (20 grams, 0.23 mole) was added to a mixture of 21.2 grams (0.1 mole) of 2,2,3,3,4,4-hexafluoropentanediol, 1.0 gram (0.004 mole) of the disodium of the diol and 200 milliliters of anhydrous ether. After stirring at 25 degrees centigrade for 8 hours, the reaction mixture was heated under reflux for 5 hours, cooled, washed with water and dried over magnesium sulfate. After evaporation of the ether, the residue was taken up in 250 milliliters of hot benzene and cooled to give 6.75 grams (41 percent recovery) of hexafluoropentanediol. Fractional distillation of the filtrate gave 12.25 grams (41 percent conversion, 54 percent yield) of methyl 9-hydroxy-6,6,7,7,8,8-hexafluoro-4-oxanonanoate, boiling point 110 degrees centigrade (0.4 millimeter), $n_D^{20}$ 1.3900, $d_4^{20}$ 1.443.

*Analysis.*—Calculated for $C_9H_{12}F_6O_4$: C, 36.25; H, 4.06; $MR_D$, 48.97. Found: C, 36.19; H, 4.29; $MR_D$, 48.98.

A higher boiling fraction from the above preparation consisted of 3.8 grams (19 percent conversion, 22 percent yield) of dimethyl 6,6,7,7,8,8-hexafluoro-4,10-dioxadecanedioate, boiling point 125 degrees centigrade (0.06 millimeter), $n_D^{20}$ 1.4028; $d_4^{20}$ 1.348.

*Analysis.*—Calculated for $C_{13}H_{18}F_6O_6$: C, 40.63; H, 4.72; $MR_D$, 69.58. Found: C, 40.79; H, 4.83; $MR_D$, 69.54.

Since variations of the compounds of the present invention, obvious to those skilled in the art, may be made without departing from the spirit thereof, it is to be understood that the invention is to be limited only by the scope of the appended claims.

We claim:

1. A compound selected from the group consisting of (A) 3-mono- and 3,5-di-lower-perfluoroalkyl substituted -4-X-alkanedioic acids, wherein X is selected from the group consisting of S, NH and N-loweralkyl; (B) their difunctional acid chlorides; and (C) their difunctional lower-alkyl esters.

2. A compound selected from the group consisting of (A) 3,5-bis(lowerperfluoroalkyl)-4-thiaheptanedioic acid; (B) their difunctional acid chlorides; and (C) their difunctional lower-alkyl esters.

3. A compound selected from the group consisting of (A) 3-lowerperfluoroalkyl-4-thiahexanedioic acid; (B) their difunctional acid chlorides; and (C) their difunctional lower-alkyl esters.

4. A compound selected from the group consisting of (A) 3-lowerperfluoroalkyl-4-azahexanedioic acid; (B) their difunctional acid chlorides; and (C) their difunctional lower-alkyl esters.

5. A compound selected from the group consisting of (A) 3-lowerperfluoroalkyl-4-loweralkyl-4-azahexanedioic acid; (B) their difunctional acid chlorides; and (C) their difunctional lower-alkyl esters.

6. 3,5-bis(lower-perfluoroalkyl)-4-thiaheptane-1,7-diol.

7. Diethyl 3,5-bis(perfluoromethyl)-4-thiaheptanedioate.

8. Diethyl 3,5-bis(perfluoropropyl)-4-thiaheptanedioate.

9. 3,5-bis(perfluoropropyl)-4-thiaheptanedioic acid.

10. 3,5-bis-(perfluoropropyl)-4-thiaheptanedioyl chloride.

11. 3,5-bis(perfluoropropyl)-4-thiaheptane-1,7-diol.

12. Diethyl 3-perfluoropropyl-4-thiahexanedioate.

13. 3-perfluoropropyl-4-thiahexanedioic acid.

14. Diethyl 3-perfluoropropyl-4-azahexanedioate.

15. 3-perfluoropropyl-4-azahexanedioic acid.

16. Diethyl 3-perfluoropropyl-4-methyl-4-azahexanedioate.

References Cited in the file of this patent

UNITED STATES PATENTS 2,700,686     Dickey et al.     Jan. 25, 1955

UNITED STATES PATENT OFFICE
CERTIFICATE OF CORRECTION

Patent No. 2,908,710

October 13, 1959

Earl T. McBee et al.

It is hereby certified that error appears in the printed specification of the above numbered patent requiring correction and that the said Letters Patent should read as corrected below.

Column 3, line 1, for "was a" read -- with a --; column 6, line 42, the formula should appear as shown below instead of as in the patent:

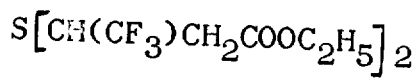

$$S[CH(CF_3)CH_2COOC_2H_5]_2$$

Signed and sealed this 11th day of October 1960.

(SEAL)

Attest:
KARL H. AXLINE
Attesting Officer

ROBERT C. WATSON
Commissioner of Patents